United States Patent [19]

Rivere

[11] 3,864,963
[45] Feb. 11, 1975

[54] METHODS AND DEVICES FOR MEASURING INSTANTANEOUSLY A MEAN PRESSURE IN A FLUID MEDIUM

[75] Inventor: Jean-Pierre Rivere, Billancourt, France

[73] Assignees: Regie Nationale des Usines Renault, Billancourt; Automobiles Peugeot, Paris, both of, France

[22] Filed: Sept. 18, 1973

[21] Appl. No.: 398,490

[30] Foreign Application Priority Data
Sept. 27, 1972 France .............................. 72.34184

[52] U.S. Cl. .................................. 73/115, 73/117.3
[51] Int. Cl. ........................................... G01m 15/00
[58] Field of Search ........................... 73/115, 117.3

[56] References Cited
UNITED STATES PATENTS

| | | | |
|---|---|---|---|
| 3,375,711 | 4/1968 | Ives et al. .......................... | 73/115 X |
| 3,389,599 | 6/1968 | Beale ................................... | 73/115 |
| 3,503,256 | 3/1970 | List et al. ............................. | 73/115 |

*Primary Examiner*—Jerry W. Myracle
*Attorney, Agent, or Firm*—Stevens, Davis, Miller & Mosher

[57] ABSTRACT

This invention provides a novel method of measuring instantaneously a pulsated information synchronized in turn with one or a plurality of mechanical devices in order to provide the mean value of the information, for example the mean pressure prevailing in the induction manifold of an internal combustion engine, characterised by the following operations: a) converting the instantaneous pressure into an analog electric signal: b) sampling said analog signal at the synchronous pulse rate of the engine; c) applying said samples to an integrator accomplishing an accurate measurement of the pulsated information on its shortest period, by converting the voltage amplitude of each sample into a time value: d) counting clock pulses during the constant-current discharge time of an integration capacitor, and e) transferring said pulses to a totalizing member.

6 Claims, 4 Drawing Figures

METHODS AND DEVICES FOR MEASURING INSTANTANEOUSLY A MEAN PRESSURE IN A FLUID MEDIUM

The present invention relates to a method of measuring instantaneously a mean pressure of a fluid medium in which pulsated waves are circulated. It constitutes an improvement in the patent application in U.S. Ser. No. 233,629 of Mar. 10, 1972, now U.S. Pat. No. 3,780,587.

The present invention is also concerned with a synchronous digit integrator device for measuring the mean pressure prevailing in the induction manifold of an internal combustion engine, for carrying out this method.

In the aforesaid patent application it is stated that pressure pulses, or possibly induction air input pulses, are in synchronism with the rotation of mechanical members, notably of an engine crankshaft.

From the spectral analysis of the waves circulating in the induction manifold it was found that the band-pass $B$ of the spectrum, when compared with the fundamental frequency $F$, is an integer $K$ such that $K = B/F_1$, wherein $K$ is practically independent of the rotational speed of the engine and of the mean value of the pressure prevailing in the induction manifold.

The method of the present invention takes advantage of these valuable properties as follows: the pressure is measured by sampling and coded directly into digit values.

The method of this invention is characterised by the following operations:

a. converting the instantaneous pressure into an analog electric signal;

b. sampling said analog signal at the rate of the synchronous engine pulses;

c. feeding said samples to an integrator accomplishing the voltage amplitude to time conversion of said samples;

d. counting the clock pulses during the constantcurrent discharge of the integration capacitor;

e. transferring said pulses to a counter.

Other features and advantages of the method of this invention and of the device for carrying out said method will appear as the following description proceeds with reference to the attached drawings, in which.

Figure 1:
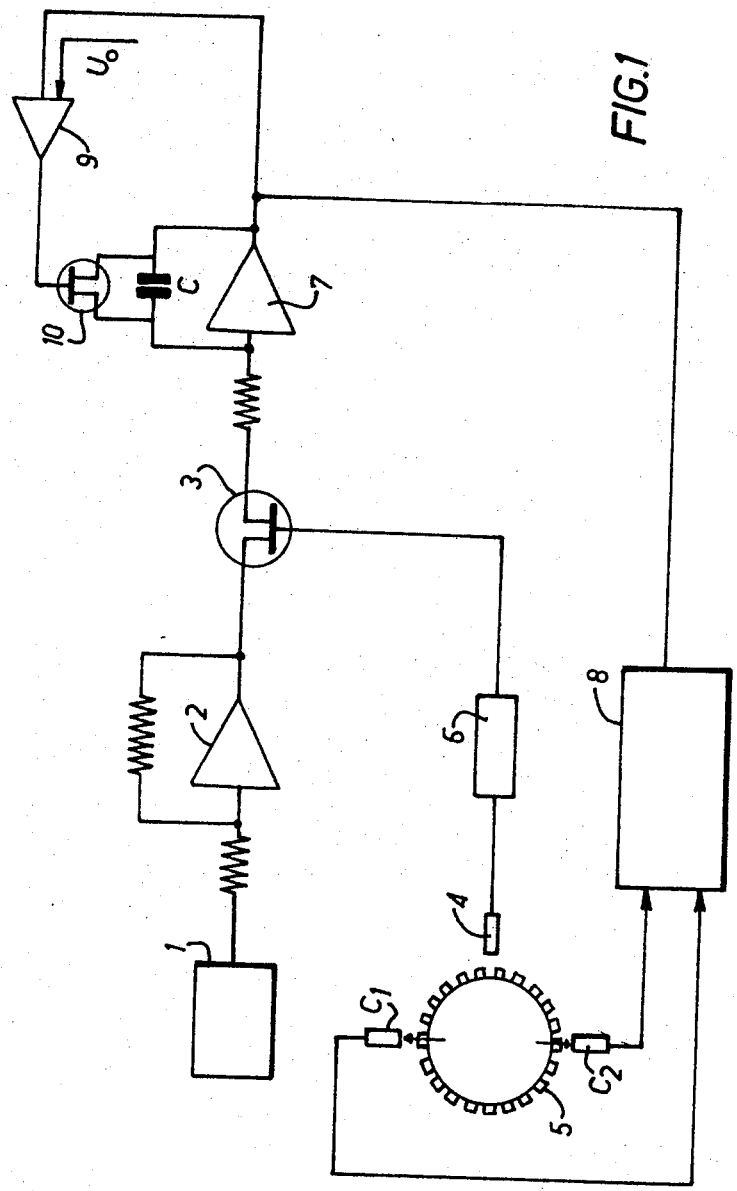
FIG. 1 is a block diagram showing the basic principle of operation of the synchronous measuring integrator according to this invention.
Figure 2:
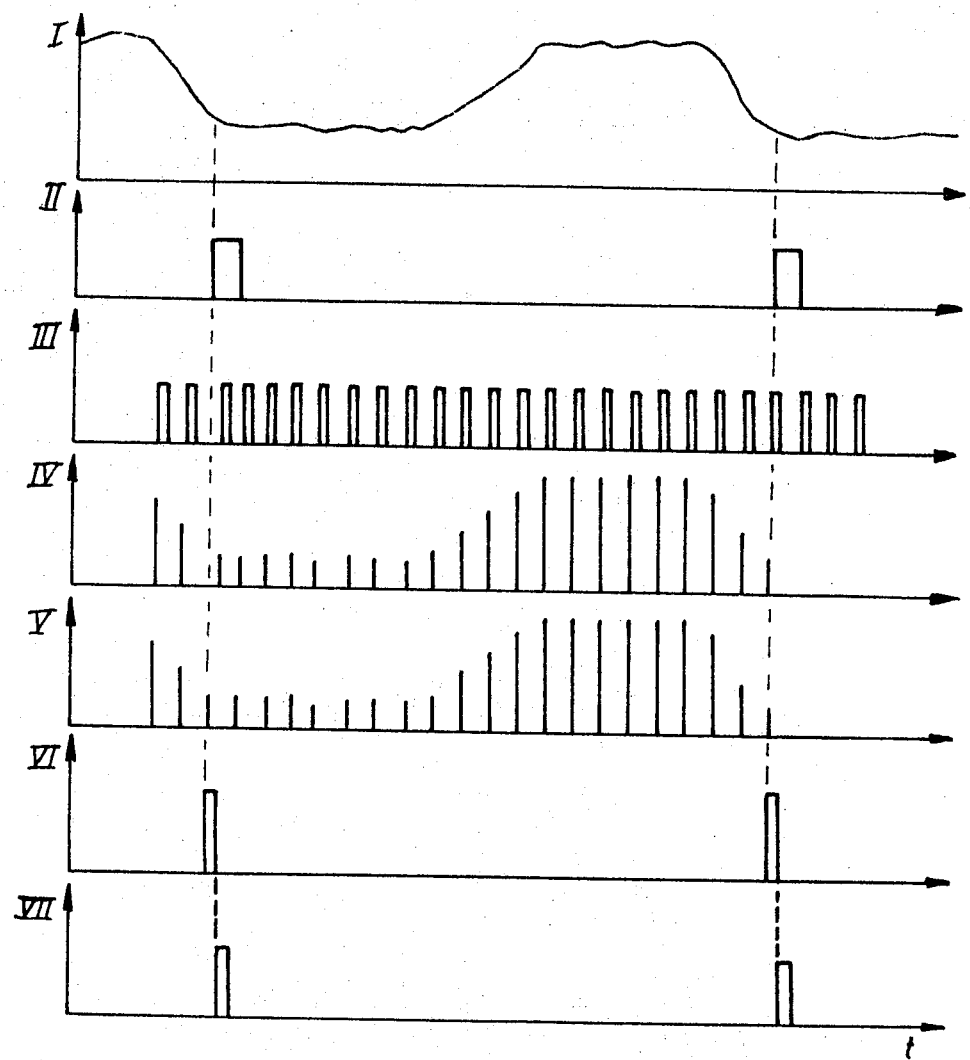
FIG. 2 is a diagram showing the signal appearing at various points of the block diagram of FIG. 1.

Referring to the block diagram of FIG. 1, it will be seen that a pressure pick-up 1 having a very fast response time is disposed at a suitable location in the induction manifold of an internal combustion engine. The signal issuing from this pick up 1 is fed to the input of a functional amplifier 2 having its gain properly set and adapted to act as an impedance adapter. At the output of amplifier 2 the analog signal illustrated at I in the diagram of FIG. 2 is obtained. This signal is fed to an analog gate 3 (consisting for example of a field-effect transistor) periodically released or triggered by pulses generated by a proximity pick-up 4 detecting the passage of the teeth of the toothed ring 5 driven by the starter motor. These pulses are firstly shaped at 6 (III, FIG. 2) and then fed to the electrode controlling the release or triggering of the analog gate 3 at the output of which samples (IV, FIG. 2) of the analog signal I, synchronous with the engine, are obtained. These samples are fed to an integrator 7. During the discharge time of integrator capacitor C the clock pulses totalized at 8 are counted. The end of the discharge of this capacitor C is detected by means of a comparator 9 which then generates a signal for resetting the integrator, this signal being fed to the gate electrode of a field-effect transistor 10 having its source and drain electrodes connected to the terminal of said capacitor C, respectively. At the output of said integrator, a digit value proportional to the value of each sample is obtained (V, FIG. 2). (The above-mentioned integrator is a voltage-frequency converter).

On the other hand, synchronizing or phasing pick ups $C_1$ and $C_2$, disposed at the top dead center and bottom dead center, respectively, generate sync pulses (II FIG. 2) from which the order for transferring the information totalized in a buffer memory and for preventing the access to the totalizer, and also resetting this totalizer (VII, FIG. 2) is generated.

The device for carrying out the method of this invention is adapted to calculate the mean value of an analog information delivered by a pick up on one-half of a crankshaft revolution, for each half-revolution thereof. The result of this measurement is available in a memory register comprising N binary elements during the entire cycle time, except during the very short time (of the order of 0.2 to 2 $\mu$s) necessary for registering or recording the new value. The moment in which the result is not available is fixed in relation to the engine and known with precision.

The device may be utilized for the analog to digit conversion of any parameter concerning the engine operation, or of any magnitude concerning this operation (temperature of cooling fluid, air, induction pressure, mass output, etc . . .). The specific example described hereinafter is concerned with the measurement of the induction pressure.

Figure 3:
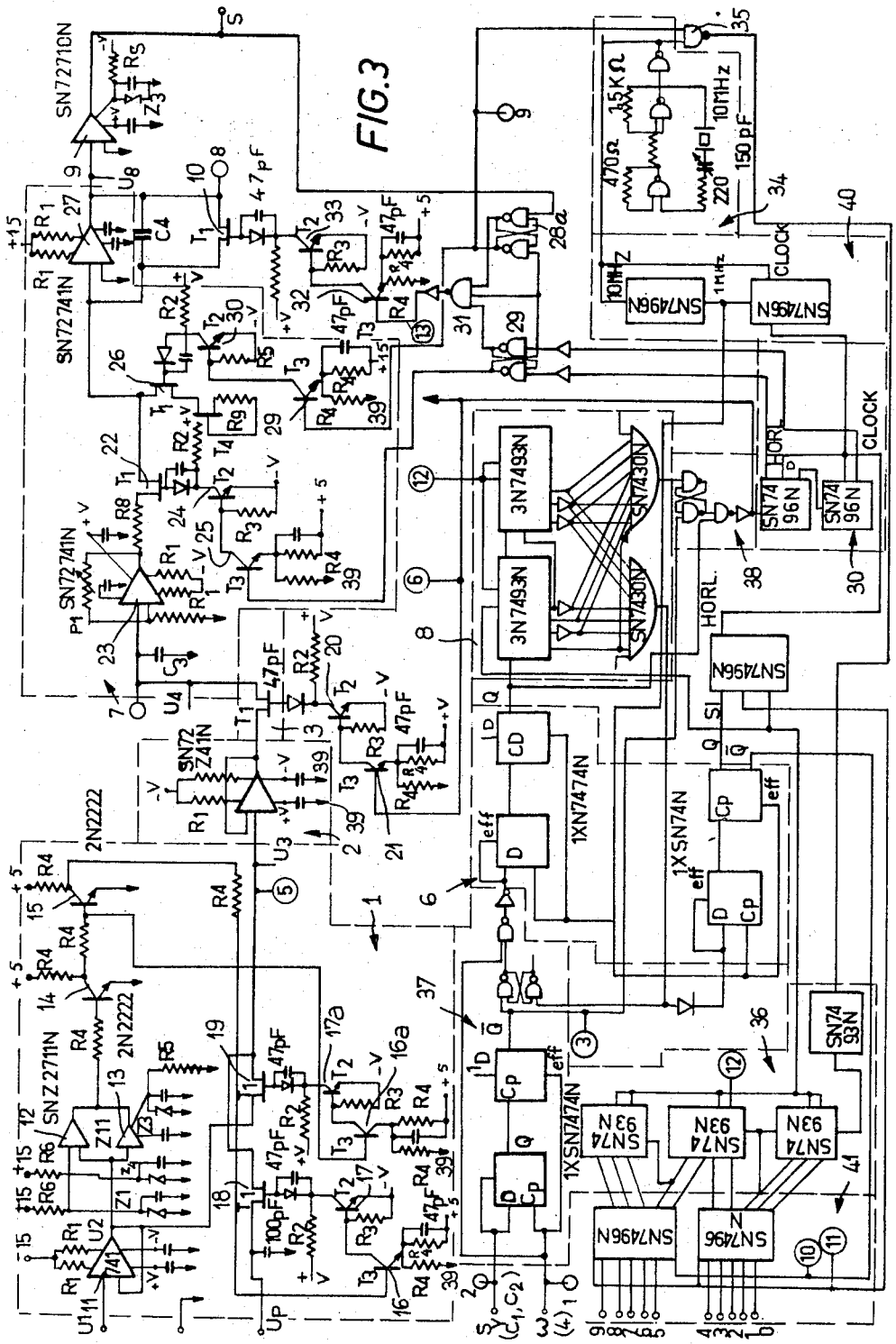
FIG. 3 is an actual wiring diagram of the device for carrying out the method of this invention.

The general characteristics of the device of which the wiring diagram is illustrated in FIG. 3 are as follows:

input voltage proportional to the pressure: 0 to 4 V;

68 samples and measurements at regular intervals, in synchronism with the engine, this corresponding to the harmonic analysis up to about 34 on a half-revolution;

digit output of 10 binary elements;

a single adjustment point permitting of adjusting the scale for the pressure to be obtained with the highest precision (which is 380 torrs the most probable valve);

global accuracy: ± 1 torr (from 170 to 760 torrs).

The operation of the device illustrated in FIG. 3 for embodying the basic principle shown by the block diagram of FIG. 1 will now be described in detail.

Figure 4:
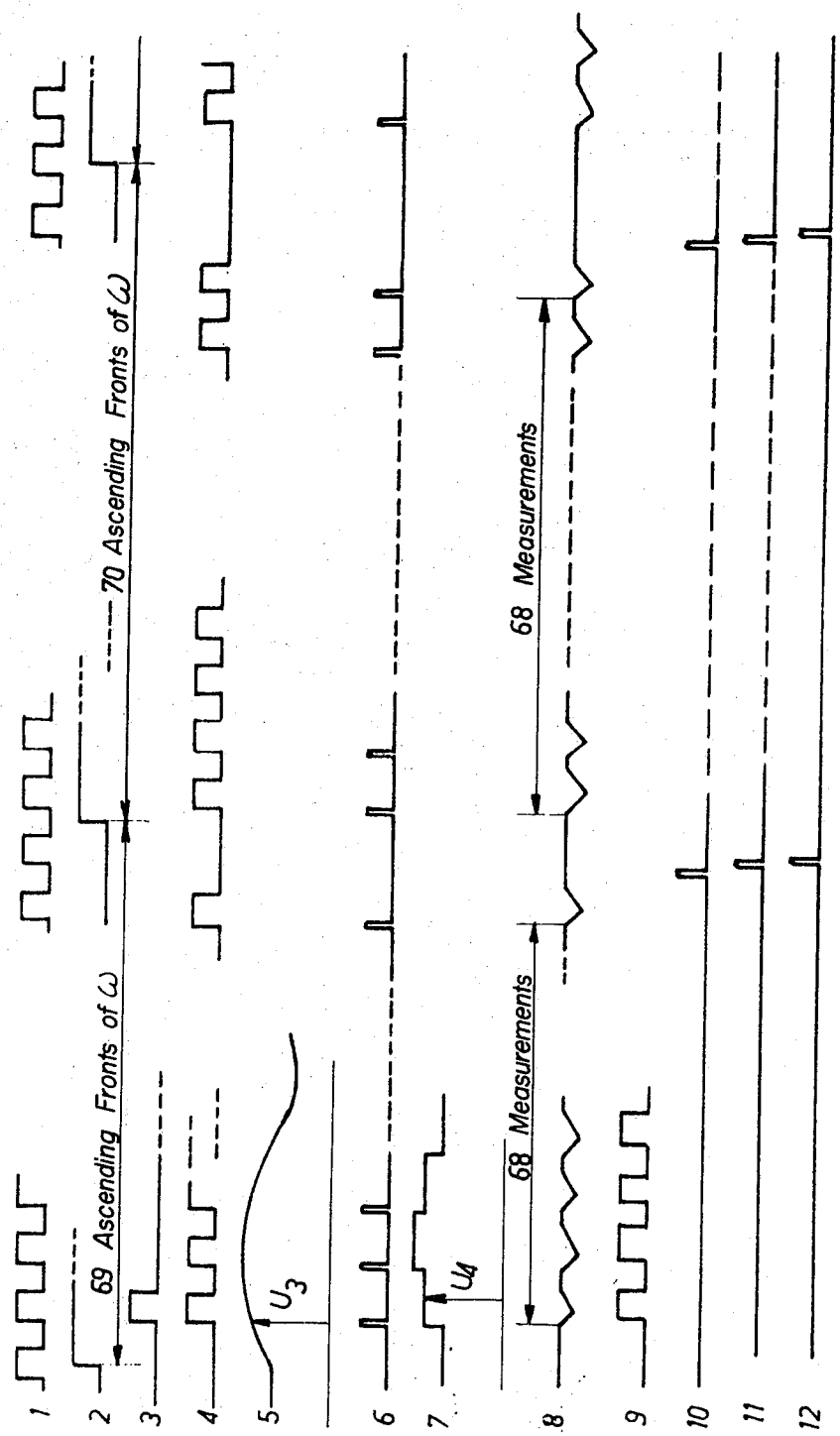
FIG. 4 is a diagram of the signals appearing at different points of the diagram of FIG. 3.

The reference numerals of the FIG. 1 are also shown in FIG. 3; encircled reference numerals in FIG. 3 correspond to the line numbers of FIG. 4.

The output voltage $U_1$ of the pressure pick up 1 is read by a follower-type operational amplifier 11, having its output connected to its input. The input impedance of this amplifier is therefore relatively high and its output impedance is zero; the gain is equal to one unit.

A pair of amplifiers 12 and 13 mounted as a comparator unit receive the voltage $U_2$ from said operational amplifier 11 so that they can detect pressures of, say, 100 to 800 torrs, respectively. The outputs of these amplifiers 12 and 13 are connected via cascode-connected transistors 14, 15, 16, 17 to the base of a field-effect transistor 18 of which one electrode receives a so-called emergency voltage $U_P$ and the other is connected to said operational amplifier 2. The output $U_2$ of the operational amplifier 11 is connected to one electrode of another field effect transistor 19 having its other electrode connected to the second electrode of transistor 18, and its base connected via another pair of cascode-connected transistor 16a, 17a to the base of transistor 15. When the pressure is less than 100 torrs or higher than 800 torrs (for example in case of pick up failure) a pulse will saturate in succession transistors 14, 15, 16, and 17 so as to measure the emergency voltage $U_P$ proportional to the opening angle of the air/fuel mixture inlet butterfly valve through the medium of the field effect transistor switch 18, while the field transistor switch 19 measures the main voltage $U_1$ when the reading is within the range of 100 to 800 torrs.

Therefore, the voltage $U_1$ or $U_P$ are selected as a function of the pressure value and collected for feeding the operational amplifier 2 having the function of adapting the impedance between the switches 18 and 19 and the sampling switch 3 also constituted by a field effect transistor having its electrodes connected the one to the output of amplifier 2 and the other to a capacitor $C_3$ of an integrator unit 7 consisting of voltage/time converter for the sampled voltage samples. The base of switch 3 is connected through a diode and cascode-connected transistors 20, 21 to the positive terminal of a voltage source.

The value of voltage $U_3$ at the input of amplifier 2 is sampled during 500 nanoseconds and kept in memory by a capacitor $C_3$; let $U_4$ be this sampled voltage which is constant for a measurement and integrated during a constant time $\tau\mu s$ equal to 9 $\mu s$ for the purposes of the present application.

The integration operation is started by closing switch 22 consisting of a field effect transistor, an operational amplifier 23 performing an impedance adaptation between capacitor $C_3$ and an output resistor $R_8$ (the input impedance and output impedance being infinite and zero, respectively). Switch 22 has its base connected through a diode and cascode-connected transistors 24 and 25 to the positive terminal of the voltage source, and through one of its electrodes to the aforesaid resistor $R_8$ and the other electrode to the input electrode of the field effect transistor constituting a switch 26. The end of the integration operation is controlled by this switch 26 which is closed when the time $\tau$ has elapsed completely; this switch 26 provides the necessary precision of the integration and avoids the incorporation, for this integration, of the time necessary for desaturating switch 22. It also permits during its closed period of discharging another capacitor $C_4$ connected between the input and output of operational amplifier 27 (connected to said switch 26) and constituting with capacitor $C_4$ the integrator proper. A field effect transistor 10 acting as a swtich is connected across the terminals of capacity $C_4$.

The thus charged capacitor $C_4$ is discharged under constant current conditions until the comparator 9 reading the voltage $U_8$ detects the passage of this voltage thorugh zero (so-called double gradient system). Under these conditions it is clear that a voltage/time converter is obtained, for the time during which the constant-current capacitor $C_4$ is discharged is proportional to the sampled voltage $U_4$. During this discharge time the comparator 9 delivers a pulse to the input of a univibrator 28a serving the purpose of closing switch 26 through transistors 29 and 30 and a diode.

This univibrator 28a is reset when another univibrator 29a is switched by means of a signal received from a clock 30a, a combination of the outputs of these univibrators 28a and 29a at the input of a three-input AND gate 31 permitting at that time of discharging said capacitor $C_4$ through transistors 32, 33 and 10.

A quartz clock 34 having a frequency of 10 MHz is provided for counting the clock pulses during the integration time through the medium of another AND gate 35. The counter pulses are accumulated or stored in a binary counter 36 connected to the totalizer 8 and having the function of totalizing the pulses issuing from said AND gate 35 and delivered by each one of the samples picked up between two measurement signals SY corresponding to the signals of the top dead center pick up $C_1$ and of the bottom dead center pick up $C_2$ of the engine.

Several functions are devolved to the logic section of the device, namely rating the measurements and counting, as well as memorizing the pressure value.

This logic section 37 permits of synchronizing across the terminals Sy and $\omega$ the generation of a dead center signal Sy and picking up a sample of the signal from pick up 4 through the input $\omega$ (delivering 69 to 70 times more pulses than the signal at Sy since the ring gear 5 has 13g teeth. The pulses at "$\omega$" are counted in a totalizer 8 which, at the $68^{th}$ pulses, blocks the calculation by means of a logic 38 or opens all the switches 18 or 19, 3, 22 and leaves the switch 26 closed (the break signal is transmitted via arrows 39).

The dead center signals are illustrated in line II of FIG. 2 and converted into gaged signals by a clock 40 (dividing by 10 the pulses delivered by clock 34) which are shown in line IV; these signals permit the passage of the binary number in totalizing counter 36 into a buffer memory 41. Thus, this memory 41 will preserve this number during the time period elapsing between two signals of line VI. The signals of line VII control the resetting of totalizer 36 whereas the number then contained in counter 36 are preserved in said buffer memory 41.

Lines V or VI illustrate the successive voltages accumulated in capacitor $C_3$ after each voltage sampling (shown in line I) controlled by the signals delivered by pick up 4 of FIG. 1, which signals are shown in line III of FIG. 2.

It will be noted that the sampled signals shown in lines IV and V are shifted by the value of a half-tooth 5 of FIG. 1 for the number of teeth being odd, the picking up of samples begins either exactly on one tooth for a half-revolution, or a half-tooth later than the dead center signal for the other dead center.

Both dead centers PMH and PMB from which the sync pulses are produced are solid with the crankshaft and phase-displaced by $\pi$. Let us assume that the toothed ring driven by the starter motor has 139 teeth, there will be 139 information ascending fronts "$\omega$" (see FIG. 4, line 1). Therefore, between two sync pulses there will one time be 69 ascending fronts, and the next time 70 (see FIG. 4, line 2). Now, for applying the same calculus to each crankshaft half-revolution it is necessary to have the same number of samples for each measurement. The average pressure $$P_m = \frac{\sum_{1}^{n} Pi}{n} = \frac{1}{n}\sum_{1}^{n} Pi = \frac{1}{n}\sum_{1}^{n} Ni$$

where $Pi$ corresponds to a pressure value at any point in front of a tooth, $n$ is the number of teeth regularly distributed on a half turn or 180° of the ring 5 and setting-in the seizing of a sample at each tooth detection, and $Ni$ is a value proportional to $Pi$.

The obtained result of average pressure is independent of the rotation speed of the ring 5, because the frequency of the pressure waves which are moving in the manifold of the internal combustion engine is in the ratio of whole numbers with the rotation frequency of said ring 5.

Therefore, the same number of samples $n = 68$ will be taken. From the ascending front of the sync pulse one can determine the first ascending front of $\omega$ (see III, FIG. 2 and line 3, FIG. 4). This will start the calculation by permitting the passage of samples or data "$\omega$," which passage will terminate at the $69^{th}$ ascending front. All the ascending fronts of $\omega$ will be converted into narrow pulses which are counted and the first 68 pulses are used for sampling the voltage U (see VI, FIG. 2 and line 6, FIG. 4); said ascending fronts, phase-shifted by 1 $\mu$s, control the beginning of the integration and, when phase-shifted by 10 $\mu$s, they control the end of this integration and the beginning of the counting of the pressure digit value. The end of the counting and the beginning of the short-circuiting of $C_4$ are controlled by the output S of the comparator circuit. The end of this short-circuit of $C_4$ is coincident with the beginning of the following integration. The counting information (line 9, FIG. 4) opens a gate and permits the passage of a number of descending fronts of from the clock set at 10 MHz, which are totalized by a counter.

At the $68^{th}$ ascending front of "$\omega$" the calculation is blocked, at the $69^{th}$ the calculation is terminated. The output record is cancelled and the new value (lines 10 and 11, FIG. 4) is recorded. The totalizer is cancelled or reset in turn together with the counters utilized for imparting a rhythm to the calculation sequence.

In the above-described example the interval elapsing between two measurements corresponds to one tooth of the toothed ring driven by the starter motor, but this interval may be set to another value, for example one fraction or one multiple of a tooth. The value thus calculated and obtained will constantly be the same value of the desired magnitude.

The degree of accuracy of the device is at least $10^{-3}$.

Finally, the analog/time conversion is not essential and could be replaced by an analog-frequency converter; in this case, the frequency is counted in lieu of the clock pulses.

The electronic components illustrated in the wiring diagram of FIG. 3 have the following values:

| | |
|---|---|
| $R_1$ : 4.7 KΩ¼ w | $T_1$ : BF (LF) 2470 |
| $R_2$ : 1 KΩ 1 w | $T_2$ : 2N 914 |
| $R_3$ : 470Ω ¼ w | $T_3$ : 2N 2907 |
| $R_4$ : 1 KΩ ¼ w | $Z_1$ : 0.1 V |
| $R_5$ : 1.5 KΩ¼ w | $Z_2$ : 3.9 V |
| $R_6$ : 10 KΩ¼ w | $Z_3$ : 3.9 V |
| $R_7$ : 5.6 KΩ¼ w | $T_4$ : 2N 4303 |
| $R_8$ : 27 KΩ¼ w | $P_1$ : 10 KΩ (adjustable) |
| $R_9$ : 22 KΩ¼ w | $C_3$ : 1,000 pF mica |
| | $C_4$ : 470 pF mica. |

All non-referenced diodes = 1 N 914.

All non-referenced capacitors are 22$n$F ceramic capacitors.

Of course, various modifications may be brough to the embodiments described and illustrated herein by way of example, as will readily occur to those conversant with the art, without inasmuch departing from the basic principles of the invention as set forth in the appended claims.

I claim:

1. A method for measuring a mean pressure in a fluid medium in synchronism with the rotation of an internal combustion engine, comprising the steps of:

measuring instantaneous values of pressure in said fluid medium;

converting said instantaneous measured pressures into an analog electrical signal;

sampling said analog signal at a pulse rate synthronized with the rotation of said engine;

integrating said sampled signal in an integrator to convert the voltage amplitude of said sampled signal into a time value to obtain an accurate measurement of the pulse information in its shortest period;

discharging an integrating capacitor in said integrator;

counting, in a counter circuit, clock pulses during the constant current discharge time of said integration capacitor;

storing clock pulses counted during said discharge time in a buffer memory; and resetting said counter circuit and said integrator upon completion of said counting of said clock pulses.

2. Apparatus for measuring a means pressure in a fluid medium in synchronism with the rotation of an internal combustion engine, comprising:

means for measuring instantaneous pressures in said fluid medium and converting said measured pressures into an analog electrical signal;

means for generating pulse signals at a rate which is synchronized with the rotation of said engine;

means for sampling said analog signal, including a gate circuit having one input coupled to the analog signal output of said measuring means and a second input coupled to the output of said synchronized pulse rate generator;

integrating means, including an integrating capacitor, coupled to the output of said sampling means for integrating said sampled signals;

means coupled to the output of said integrating means for converting the amplitude of said sampled signals into a time value, including a clock pulse generator and counter means for counting clock pulses generated by said clock pulse generator during a predetermined constant-current discharge time period of said integrating capacitor;

means coupled to said counter means for totalizing the clock pulses counted for a sampled signal during a predetermined portion of the rotational period of said engine; and means for resetting said integrating means, including a comparator circuit coupled to said integrating means for comparing the output signal from said integrating means with a reference voltage and for generating a comparison signal when said integrating and reference signals are equal, and switch means connected across said integrating capacitor and connected to the output of said comparator means, said switch being closed by said comparison signal to reset said integrating means.

3. The apparatus according to claim 2, wherein said pressure measuring means comprises a pressure pick-up and a high-input low-output impedance amplifier circuit having its input coupled to the output of said pick-up and its output coupled to the input of said sampling means.

4. The apparatus according to claim 2, wherein said sampling means comprises an impedance matching amplifier having an input coupled to an output of said pressure measuring means and an electronic switch member having input and output electrodes coupled to said impedance matching amplifier and to said integrating means, respectively, and a control electrode coupled to said synchronized pulse signal generator.

5. The apparatus according to claim 2, wherein said integrating means comprises an impedance matching amplifier coupled to the ouput of said impedance matching amplifier, a constant-current generator coupled to the output of said electronic switch member, and an integrating amplifier, to which said integrating capacitor is connected, having an input coupled to said constant-current generator and an output coupled to said comparator circuit.

6. The apparatus according to claim 2, wherein:

said pressure measuring means comprises a pressure pickup and a high-input low-output impedance amplifier circuit having its input coupled to the output of said pickup;

said sampling means comprises an impedance matching amplifier having an input coupled to an output of said high-input low-output impedance amplifier of said pressure measuring means, and an electronic switch member having an input electrode coupled to said impedance matching amplifier and a control coupled to said synchronized pulse signal generator; and said integrating means comprises a second impedance matching amplifier coupled to an output electrode of said electronic switch member, a second electronic switch member coupled to the output of said second impedance matching amplifier, a constant-current generator coupled to the output of said second electronic switch member, and an integrating amplifier, to which said integrating capacitor is connected, having an input coupled to said constantcurrent generator and an output coupled to said comparator circuit.

* * * * *